United States Patent
Suel, II et al.

(10) Patent No.: US 10,657,938 B2
(45) Date of Patent: May 19, 2020

(54) APPLIANCE WITH USER CUSTOMIZABLE ALERT TUNES

(71) Applicant: Haier US Appliance Solutions, Inc., Wilmington, DE (US)

(72) Inventors: Richard Dean Suel, II, Louisville, KY (US); Ryan Michael Hartlage, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/159,814

(22) Filed: Oct. 15, 2018

(65) Prior Publication Data

US 2020/0118531 A1 Apr. 16, 2020

(51) Int. Cl.
*G10H 1/057* (2006.01)
*G10H 1/26* (2006.01)
*H04L 12/28* (2006.01)
*G10H 1/08* (2006.01)

(52) U.S. Cl.
CPC .............. *G10H 1/0575* (2013.01); *G10H 1/08* (2013.01); *G10H 1/26* (2013.01); *H04L 12/2823* (2013.01); *H04L 2012/285* (2013.01)

(58) Field of Classification Search
CPC .......... G10H 1/0575; G10H 1/08; G10H 1/26; H04L 12/2823; H04L 2012/285
USPC .......................................................... 84/627
See application file for complete search history.

(56) References Cited

U.S. PATENT DOCUMENTS

| | | | | |
|---|---|---|---|---|
| 7,424,809 | B2 * | 9/2008 | Son | D06F 39/005 68/12.27 |
| 7,439,439 | B2 * | 10/2008 | Hayes | F24C 7/082 84/600 |
| 7,709,725 | B2 * | 5/2010 | Toledano | G10H 1/34 84/600 |
| 7,750,227 | B2 * | 7/2010 | Hayes | F24C 7/082 84/600 |
| 8,259,916 | B2 * | 9/2012 | Wang | H04M 19/04 379/142.06 |
| 9,888,452 | B2 * | 2/2018 | Logan | H04W 68/00 |
| 2002/0000092 | A1 * | 1/2002 | Sharood | F25D 29/00 62/127 |
| 2004/0189462 | A1 * | 9/2004 | Eilers | D06F 33/02 340/531 |
| 2005/0086979 | A1 * | 4/2005 | Son | D06F 39/005 68/3 R |
| 2005/0107128 | A1 * | 5/2005 | Deeds | H04M 19/041 455/567 |
| 2006/0011044 | A1 * | 1/2006 | Chew | G10H 1/34 84/609 |

(Continued)

FOREIGN PATENT DOCUMENTS

CN 106385656 A 2/2017
DE 102008034144 B4 2/2010

*Primary Examiner* — Jeffrey Donels
(74) *Attorney, Agent, or Firm* — Dority & Manning, P.A.

(57) ABSTRACT

A method for customizing appliance alert tunes includes downloading a user selected alert tune from a server to an appliance over a network. The user selected alert tune is a plurality of synthesized notes. The method also includes saving the user selected alert tune in a memory of the appliance and playing the user selected alert tune on a sound emitter of the appliance in response to an activation condition for the user selected alert tune.

14 Claims, 2 Drawing Sheets

(56) References Cited

U.S. PATENT DOCUMENTS

2006/0164255 A1\* 7/2006 Humbert .............. G05B 19/048
                                                                                     340/679
2015/0148927 A1\* 5/2015 Georges ............... G10H 1/0025
                                                                                      700/94

\* cited by examiner

APPLIANCE WITH USER CUSTOMIZABLE ALERT TUNES

FIELD OF THE INVENTION

The present subject matter relates generally to user alerts for appliances.

BACKGROUND OF THE INVENTION

Appliances generally include one or more user alerts. The user alerts are activated under various conditions. For example, a cycle completion user alert may be activated when an appliance cycle is complete. Generally, the user alerts are factory programmed by an appliance manufacturer. Audio alerts are generally a simple beep or series of beeps. Such audio alerts may be uninteresting and/or monotonous.

BRIEF DESCRIPTION OF THE INVENTION

Aspects and advantages of the invention will be set forth in part in the following description, or may be apparent from the description, or may be learned through practice of the invention.

In a first example embodiment, a method for customizing appliance alert tunes includes downloading a user selected alert tune from a server to an appliance over a network. The user selected alert tune includes data corresponding to a plurality of synthesized notes. The method also includes saving the user selected alert tune in a memory of the appliance and playing the user selected alert tune on a sound emitter of the appliance in response to an activation condition for the user selected alert tune.

In a second example embodiment, an appliance with user customizable alert tunes includes a network adapter, a sound emitter, one or more processors and at least one memory coupled to the one or more processors. The at least one memory includes computer-readable instructions for execution by the one or more processors to cause the one or more processors to perform operations. The operations include downloading a user selected alert tune from a server via the network interface. The user selected alert tune includes data corresponding to a plurality of synthesized notes. The operations also include saving the user selected alert tune in the at least one memory and playing the user selected alert tune on the sound emitter in response to an activation condition for the user selected alert tune.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figure.

DETAILED DESCRIPTION

Figure 1:
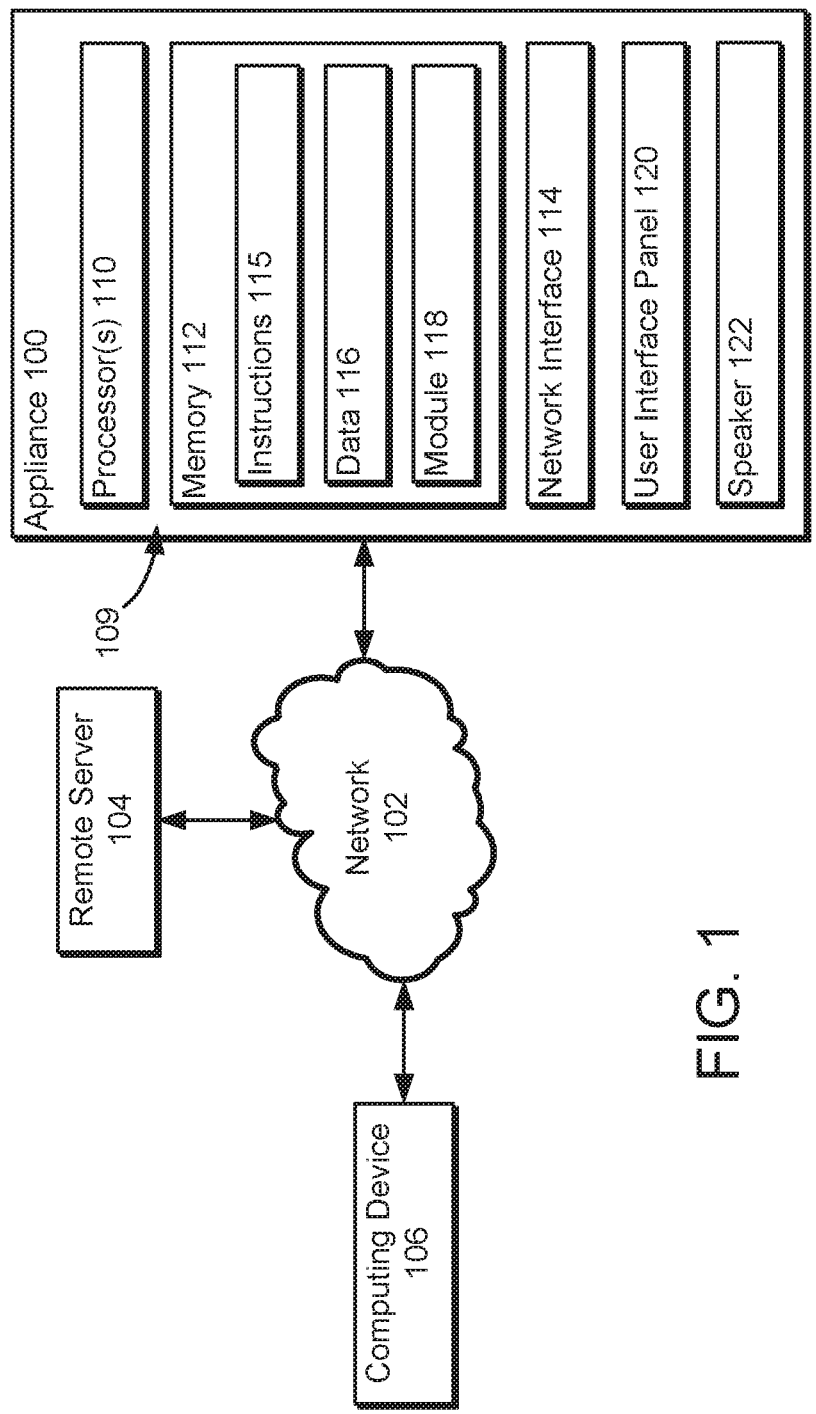
FIG. 1 is a schematic view of a system for user customization of alert tunes on an appliance according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic view of a network connected appliance 100 according to an example aspect of the present subject matter. Appliance 100 is connectable to a network 102. Thus, e.g., appliance 100 may communicate with a remote server 104 via network 102. In particular, appliance 100 may receive data from remote server 104 via network 102. As discussed in greater detail below, appliance 100 includes features for downloading a user selected alert tune. Thus, the user alerts on appliance 100 may customized.

Appliance 100 includes one or more processors 110, a memory 112, and a network interface 114. As used herein, an appliance can be any machine or device for performing a specific task that also includes features for connecting to a network, including, without limitation, a clothes dryer, a clothes washer, a dishwasher, a refrigerator, a stove, an oven, a microwave, a cooktop, a range hood, a window AC unit, an HVAC system controller, a water heater, etc. Network interface 114 of appliance 100 can include any suitable components for interfacing with one more networks, such as network 102. For example, network interface 114 of appliance 100 may include transmitters, receivers, ports, controllers, antennas, or other suitable components.

Network interface 114 may establish communication with network 102 via a connection through any suitable medium, e.g., wired or wireless. Network 102 may be any type of communications network, such as a local area network (e.g. intranet), wide area network (e.g. Internet), or some combination thereof. In general, communication between controller 109 and network 102 may be carried via associated network interfaces using any type of connection, using a variety of communication protocols (e.g. TCP/IP, HTTP), encodings or formats (e.g. HTML, XML), and/or protection schemes (e.g. VPN, secure HTTP, SSL). In particular, the network 102 may be a wireless local area network (WLAN) configured to conform to IEEE 802.11.

The processor(s) 110 of appliance 100 can be any suitable processing device, such as a microprocessor, microcontroller, integrated circuit, or other suitable processing device. The memory 112 of appliance 100 can include any suitable computing system or media, including, but not limited to, non-transitory computer-readable media, RAM, ROM, hard drives, flash drives, or other memory devices. The memory 112 of appliance 100 can store information accessible by processor(s) 110 of appliance 100, including instructions 115 that can be executed by processor(s) 110 to control various components of appliance 100 to provide appliance functionality and data 116. Thus, the combination of one or more processors 110 and memory 112 may correspond to a controller configured to implement various programs or methods to operate appliance 100, and processors 110 and memory 112 may be collectively referred to herein as a controller 109. Input/output ("I/O") signals may be routed between controller 109 and various operational components of appliance 100 along wiring harnesses that may be routed within appliance 100.

A module 118 is included or stored in memory 112 of appliance 100. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media. Thus, while module 118 is shown stored in memory 112 of appliance 100 in the example embodiment shown in FIG. 1, module 118 may be stored in or implemented by any other suitable component of system 100 in alternative example embodiments.

Appliance 100 also includes a user interface panel 120. User interface panel 120 is located within convenient reach of a user of appliance 100. User interface panel 120 includes various input components, such as one or more of a variety of touch-type controls, electrical, mechanical or electro-mechanical input devices including knobs, rotary dials, push buttons, and touch pads. The user interface panel 120 may include a display component, such as a digital or analog display device, designed to provide operational feedback to a user. User interface panel 120 also includes a sound emitter 122 for generating an audible alert. Sound emitter 122 may be a speaker, piezo buzzer, etc.

Various appliance features of appliance 100 may be activated/deactivated by a user manipulating the input components on user interface panel 120. Thus, e.g., when appliance 100 is a cooktop or oven appliance, a user may manipulate knobs or buttons on user interface panel 120 to activate and deactivate heating elements of the appliance. As another example, when appliance 100 is a refrigerator appliance, a user may manipulate buttons on user interface panel 120 to adjust the sealed system set temperature of the appliance. As yet another example, when appliance 100 is a washing machine or dryer appliance, a user may manipulate knobs or buttons on user interface panel 120 to start treatment of clothing items within the appliance.

As may be seen in FIG. 1, a computing device 106 is connectable to a network 102. Thus, e.g., computing device 106 may communicate with appliance 100 and/or remote server 104 via network 102. As an example, a user of computing device 106 may select an alert tune for downloading to appliance 100, e.g., from remote server 104, via network 102. Thus, computing device 106 may include suitable input components, such as touch-type controls, electrical, mechanical or electro-mechanical input devices, etc. for selecting an alert tune. Computing device 106 may also include a suitable display, such as a digital or analog display. As may be seen from the above, computing device 106 is network connected and includes user inputs and a display. Thus, e.g., computing device 106 may be a smartphone, tablet, network connected television, etc. that allows display of data from network 102 and transmission of data over network 102. It will be understood that controller 109 and computing device 106 may communicate over a direct serial connection between controller 109 and computing device 106. Thus, e.g., a user of computing device 106 may select an alert tune for downloading to appliance 100 via a direct serial network connection 102. The direct serial connection may be wireless or wired.

An example method for customizing appliance alert tunes will now be described. The appliance alert tune customization method may be an advantageous feature for a network connected appliance and help drive demand for such appliance. For example, a user of such appliance may customize the alert tune to a favorite sports team's fight song, a movie theme song, or something entirely unique. It will be understood that while discussed below in a certain sequence, the appliance alert tune customization method may be performed in other suitable sequences in alternative example embodiments. Thus, the appliance alert tune customization method is not limited to the particular sequence described below.

Initially, a user of appliance 100 may select an alert tune for appliance 100. As an example, the user may utilize computing device 106 to select one of a plurality of available alert tunes on a web application or a mobile application as a user selected alert tune. As another example, the user may utilize computing device 106 to create the user selected alert tune. Thus, the user may utilize computing device 106 to create the user selected alert tune on a web application or a mobile application.

The user selected alert tune is data corresponding to a plurality of synthesized notes. Thus, the data of the user selected alert tune may define the plurality of synthesized notes, but user selected alert tune is not stored in synthesized form. Rather, the data corresponding to synthesized notes is communicated to appliance 100, e.g., as a tune description, and appliance 100 synthesizes the notes of the user selected alert tune from the data. In particular, controller 109 may synthesize the user selected alert tune from the data to play the plurality of synthesized notes on sound emitter 122.

Figure 2:
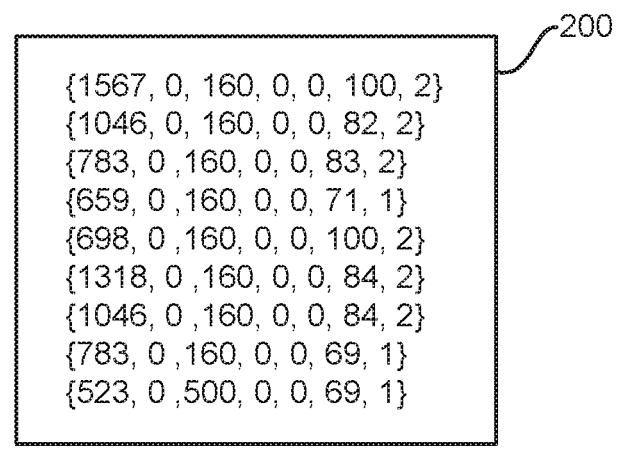
FIG. 2 is a table for a user customization of alert tune according to an example embodiment of the present subject matter.

As an example, each note of the plurality of synthesized notes in the user selected alert tune may have an attack-decay-sustain-release format. In particular, the plurality of synthesized notes in the user selected alert tune may be a table of attack-decay-sustain-release synthesized notes. Thus, the user selected alert tune may be composed of simple synthesized notes in order to allow the user selected alert tune to be saved within the limited memory of memory 112 of appliance 100, as discussed in greater detail below. For example, each note of the plurality of synthesized notes may be no greater than twelve (12) bytes. An example table 200 of attack-decay-sustain-release synthesized notes that may be stored within memory 112 of appliance 100 is shown in FIG. 2.

The user selected alert tune is downloaded from server 104 to appliance 100 over network 102. The user selected alert tune is then saved in memory 112 of appliance 100. The user selected alert tune is played from memory 112 on sound emitter 122 in response to an activation condition for the user selected alert tune. The activation condition may be any suitable event, such as completion of a cycle, start of a cycle, etc. The user selected alert tune may replace a default alert tune for the activation condition.

It will be understood that a plurality of user selected alert tunes may be selected, downloaded, saved, and played utilizing the above described process. Each of the plurality of user selected alert tunes may be played for a respective activation condition.

As may be seen from the above, the present subject matter allows a user to create a custom alert tune using a mobile app or a web app. Alternatively, the user can select from a collection of submitted tunes from other users. The user downloads the selected, custom tune to his or her appliance through a network, and the downloaded tune may be saved into an ERD slot. When the appliance plays a tune and the custom tune slot for that state (i.e. start, cycle complete, etc), the appliance will play the custom tune. Otherwise, the appliance plays the factory default tune. By using synthesized notes (e.g., in attack-decay-sustain-release format), the tune may be small and completely numerical. Thus, it can be easy to generate the tune and transfer the tune to the ERD slot.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for customizing appliance alert tunes, comprising:
    downloading a user selected alert tune from a server to an appliance over a network, the user selected alert tune is data corresponding to a plurality of synthesized notes;
    saving the user selected alert tune in a memory of the appliance; and
    playing the user selected alert tune, rather than a default alert tune, from the memory of the appliance on a sound emitter of the appliance in response to an alert tune activation condition for,
    wherein the appliance is one of a clothes dryer, a clothes washer, a dishwasher, a refrigerator, a stove, an oven, a microwave, a cooktop, a range hood, a window air-conditioning unit, and a water heater, and
    wherein each note of the plurality of synthesized notes is no greater than twelve bytes within the memory of the appliance.

2. The method of claim 1, wherein each note of the plurality of synthesized notes has an attack-decay-sustain-release format.

3. The method of claim 2, wherein the plurality of synthesized notes is a table of attack-decay-sustain-release synthesized notes.

4. The method of claim 1, further comprising, prior to downloading the user selected alert tune, selecting one of a plurality of available alert tunes on a web application or an application as the user selected alert tune.

5. The method of claim 1, wherein the user selected alert tune is also a user created alert tune.

6. The method of claim 5, wherein a user creates the user selected alert tune on a web application or an application.

7. The method of claim 1, further comprising:
    downloading an additional user selected alert tune from the server to the appliance over the network, the additional user selected alert tune comprising data corresponding to an additional plurality of synthesized notes;
    saving the additional user selected alert tune in the memory of the appliance; and
    playing the additional user selected alert tune on the sound emitter of the appliance in response to an activation condition for the additional user selected alert tune, the activation condition for the additional user selected alert tune being different than the activation condition for the user selected alert tune.

8. An appliance with user customizable alert tunes, comprising:
    a network adapter;
    a sound emitter;
    one or more processors; and
    at least one memory coupled to the one or more processors, the at least one memory comprising computer-readable instructions for execution by the one or more processors to cause the one or more processors to perform operations, the operations comprising:
        downloading a user selected alert tune from a server via the network interface, the user selected alert tune is data corresponding to a plurality of synthesized notes;
        saving the user selected alert tune in the at least one memory; and
        playing the user selected alert tune on the sound emitter, rather than a default alert tune, from the at least one memory in response to an alert tune activation condition,
    wherein the appliance is one of a clothes dryer, a clothes washer, a dishwasher, a refrigerator, a stove, an oven, a microwave, a cooktop, a range hood, a window air-conditioning unit, and a water heater, and
    wherein each note of the plurality of synthesized notes is no greater than twelve bytes within the memory of the appliance.

9. The appliance of claim 8, wherein each note of the plurality of synthesized notes has an attack-decay-sustain-release format.

10. The appliance of claim 9, wherein the plurality of synthesized notes is a table of attack-decay-sustain-release synthesized notes.

11. The appliance of claim 8, wherein, prior to downloading the user selected alert tune, the user selected alert tune is selected from a plurality of available alert tunes on a web application or an application.

12. The appliance of claim 8, wherein the user selected alert tune is also a user created alert tune.

13. The appliance of claim 12, wherein the user selected alert tune is created on a web application or an application.

14. The appliance of claim 8, wherein the operations further comprise:
    downloading an additional user selected alert tune from the server via the network interface, the additional user selected alert tune comprising data corresponding to an additional plurality of synthesized notes;
    saving the additional user selected alert tune in the at least one memory; and
    playing the additional user selected alert tune on the sound emitter in response to an activation condition for the additional user selected alert tune, the activation condition for the additional user selected alert tune being different than the activation condition for the user selected alert tune.

* * * * *